Figure 6:
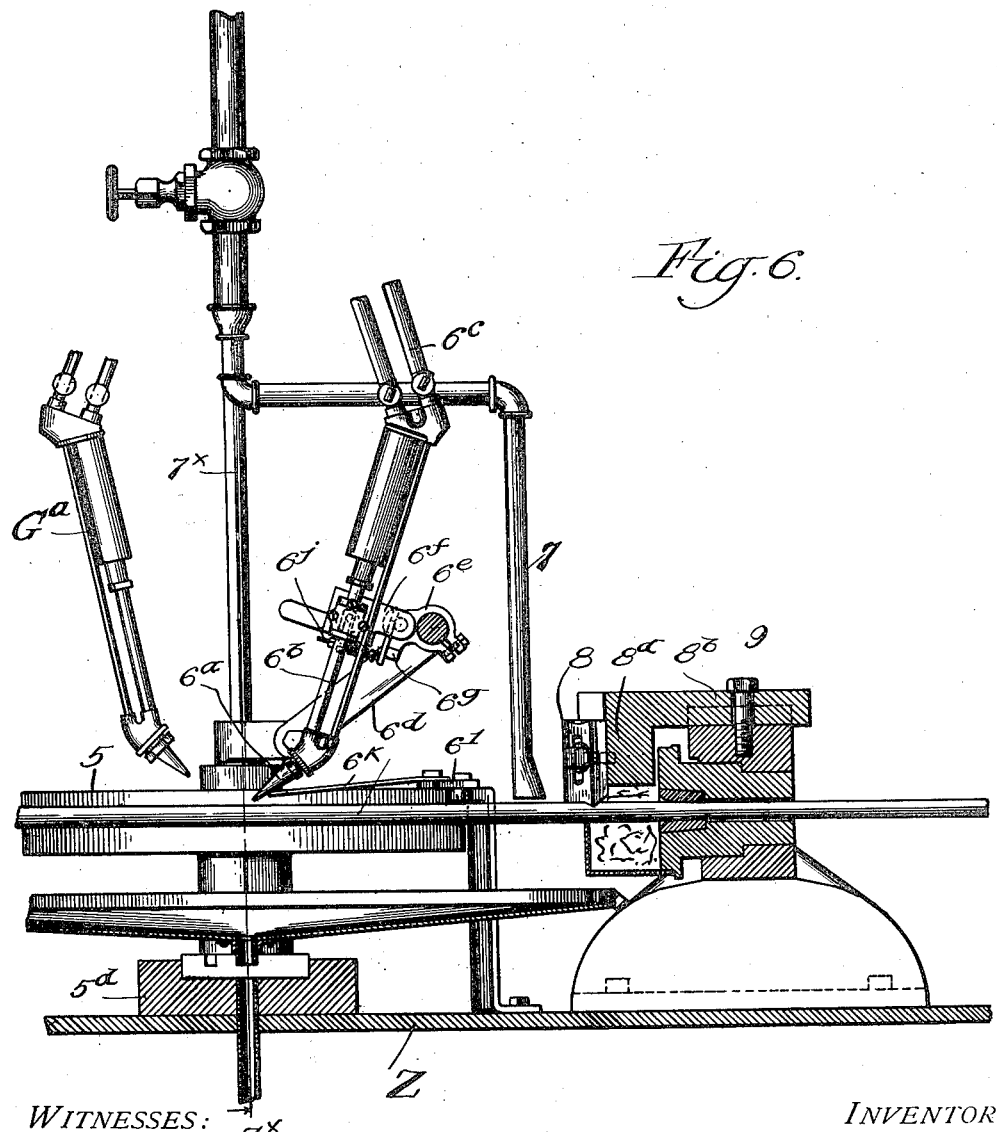

M. B. LLOYD.
PROCESS OF MANUFACTURING METAL TUBES.
APPLICATION FILED MAR. 9, 1912.
1,028,039.
Patented May 28, 1912.
6 SHEETS—SHEET 1.
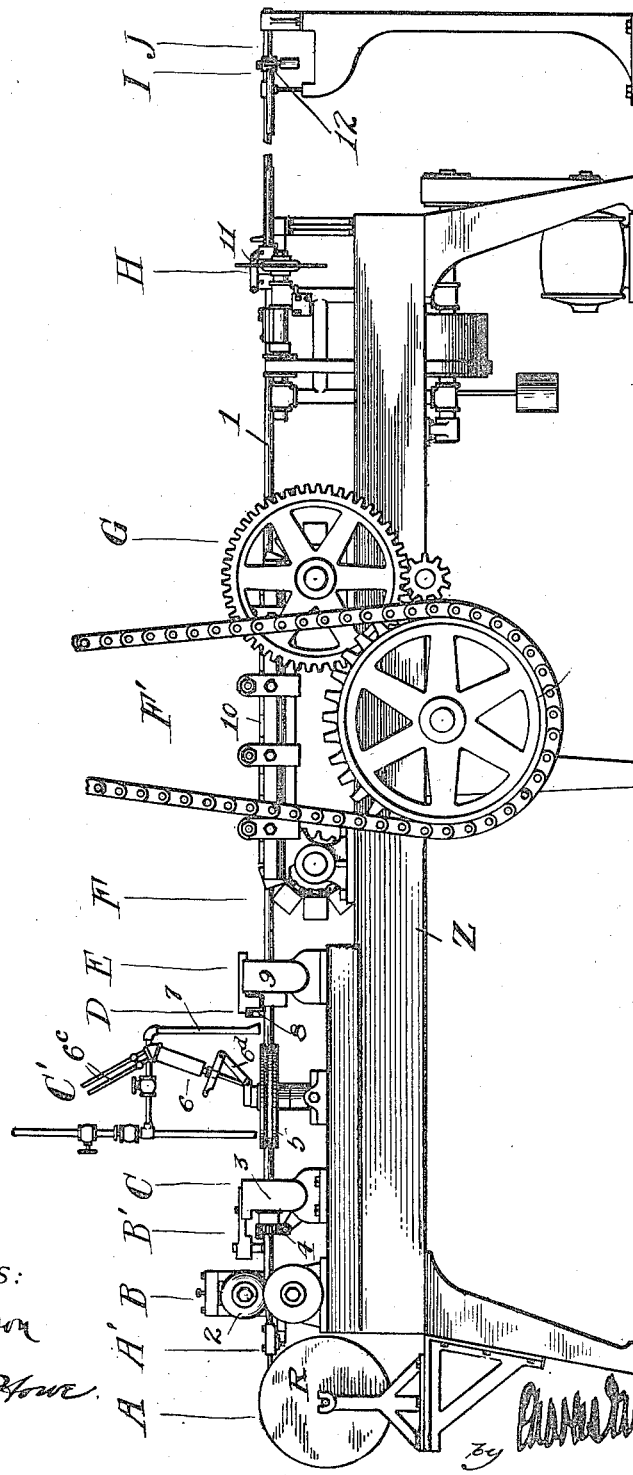
WITNESSES:
INVENTOR
Marshall B. Lloyd
by Attorney

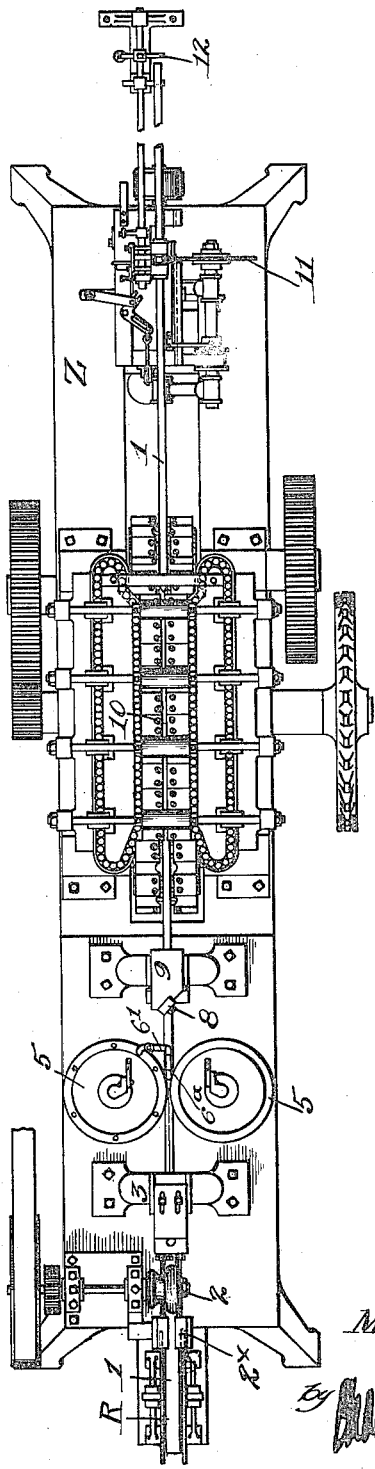

M. B. LLOYD.
PROCESS OF MANUFACTURING METAL TUBES.
APPLICATION FILED MAR. 9, 1912.
1,028,039.
Patented May 28, 1912.
6 SHEETS—SHEET 3.
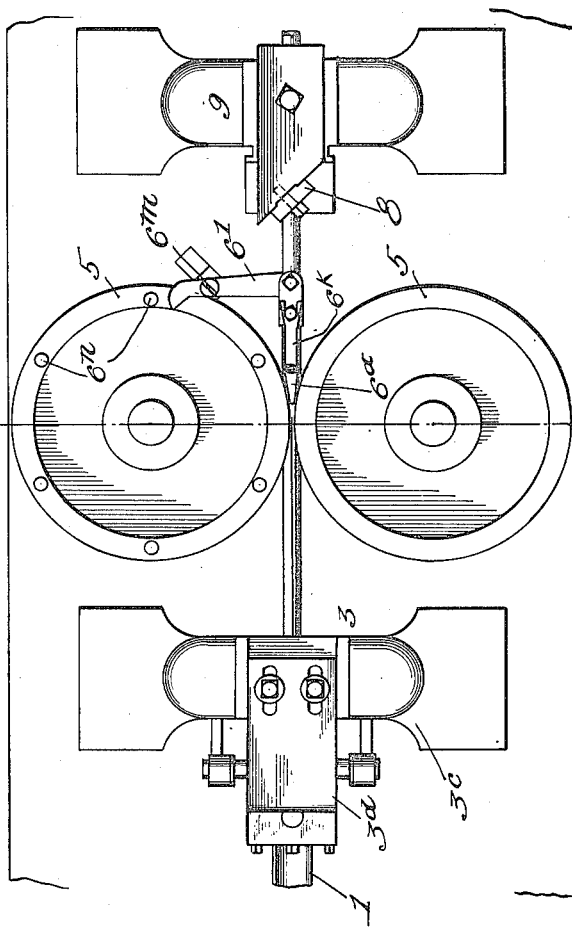
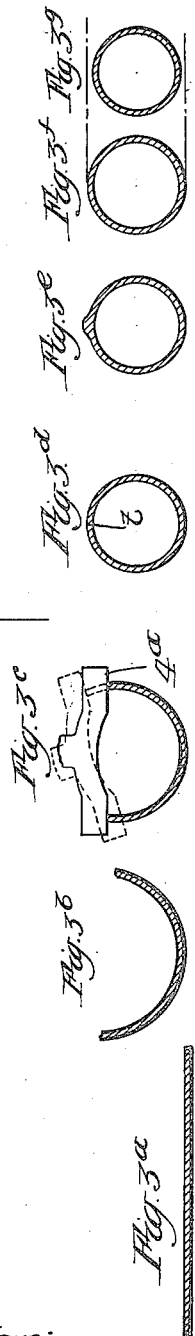
Witnesses:
Arthur W. Nelson
Earl E. Howe
Inventor:
Marshall B. Lloyd
by [signature] Att'y

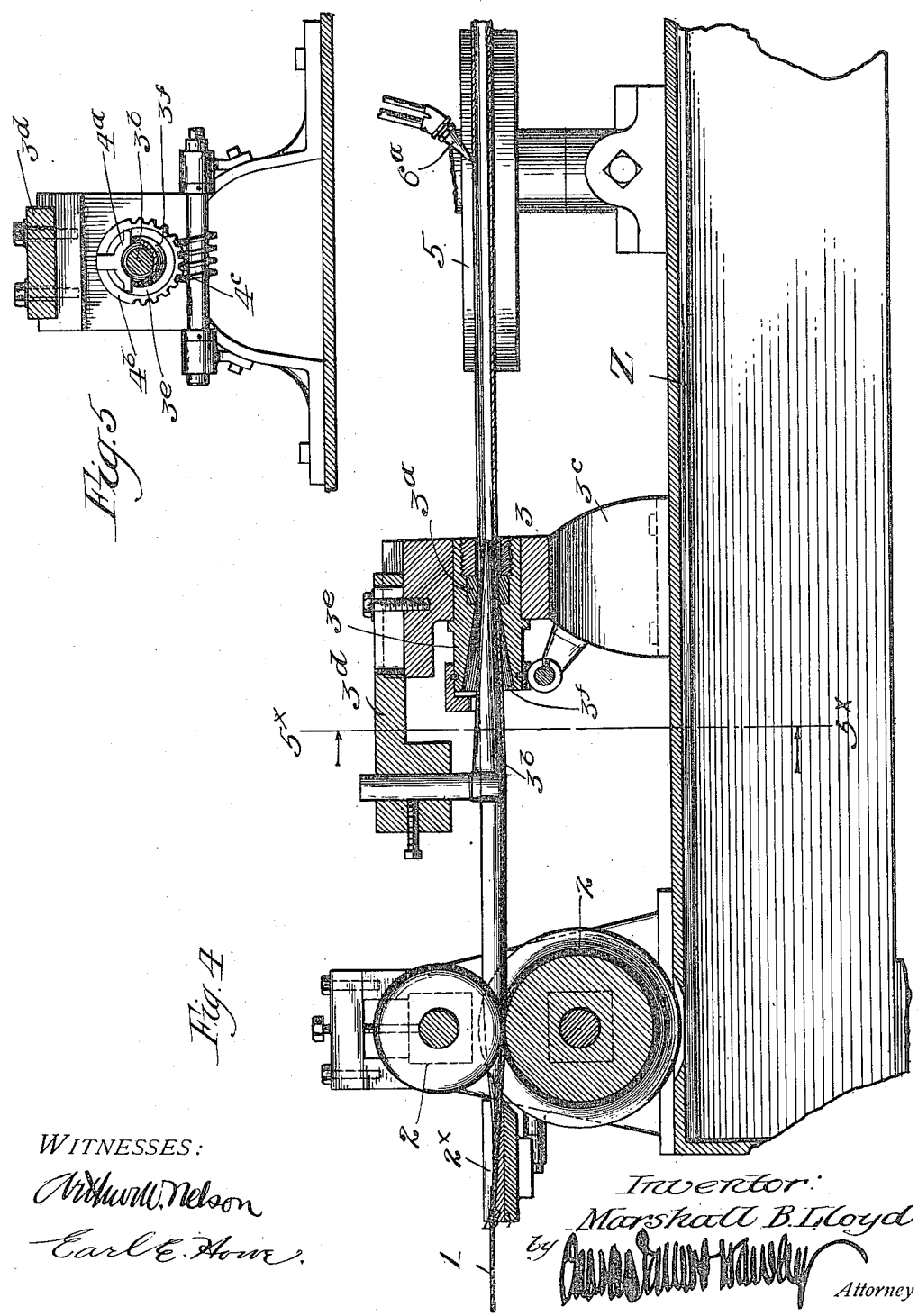

M. B. LLOYD.
PROCESS OF MANUFACTURING METAL TUBES.
APPLICATION FILED MAR. 9, 1912.

1,028,039.

Patented May 28, 1912.
6 SHEETS—SHEET 5.

WITNESSES:

INVENTOR
Marshall B. Lloyd
BY
Attorney

M. B. LLOYD.
PROCESS OF MANUFACTURING METAL TUBES.
APPLICATION FILED MAR. 9, 1912.

1,028,039.

Patented May 28, 1912.

6 SHEETS—SHEET 6.

WITNESSES:

INVENTOR
Marshall B. Lloyd
BY
Attorney

UNITED STATES PATENT OFFICE.

MARSHALL BURNS LLOYD, OF MENOMINEE, MICHIGAN, ASSIGNOR TO AUTOMATIC WELDING COMPANY, OF MENOMINEE, MICHIGAN, A CORPORATION OF MICHIGAN.

PROCESS OF MANUFACTURING METAL TUBES.

1,028,039.      Specification of Letters Patent.      Patented May 28, 1912.

Original application filed July 12, 1911, Serial No. 638,202. Divided and this application filed March 9, 1912. Serial No. 682,704.

*To all whom it may concern:*

Be it known that I, MARSHALL BURNS LLOYD, a citizen of the United States, and a resident of Menominee, Menominee county, Michigan, have invented certain new and useful Improvements in Processes of Manufacturing Metal Tubes, of which the following is a specification.

This is a divisional application, the subject matter which is herein described and claimed, having been disclosed but not claimed in my copending application Serial No. 638,202, filed in the United States Patent Office July 12, 1911, entitled "Continuous process of manufacturing metal tubes."

My invention relates to the art of manufacturing metal tubes, and has special reference to improvements in the art of manufacturing butt welded metal tubes. And my invention is particularly directed to the manufacture of thin walled metal tubes of the kind used in the construction of light vehicles, such as bicycles; as distinguished from thick walled, water, steam and gas pipes, which are being produced by processes that are not applicable to the manufacture of thin walled tubing.

As compared with my hereinafter described invention, the present day processes of making seamed and butt welded metal tubing, are slow, laborious and wasteful; require plants and equipments which are large and expensive to construct, to operate and to maintain; and, produce tubing which is not dependably uniform.

The object of my invention is to produce metal tubes of superior quality, at less cost than has been possible hitherto; in brief, to produce them with less labor, with labor of lower grade, with less power, with less heat, with a less expensive plant or equipment, in less time, in less space, and, virtually without waste of material. As more fully disclosed hereinafter, I attain these and other objects and results by eliminating, and avoiding the necessity for, many steps commonly performed in the manufacture of welded metal tubes, and, by reducing to a constant every factor or step in the handling or manipulation of the stock, performing the same acts, imposing the same strains, in identical periods of time, upon every part thereof. I set a tube in motion longitudinally, and while it is in motion I perform upon it all of the acts necessary to weld the longitudinal seam thereof.

My invention will be more readily understood by reference to the accompanying drawings forming part of this specification, and in which I have illustrated the several steps comprising my process as practiced in the machine which I find best suited to the purpose of my invention.

Figure 7:
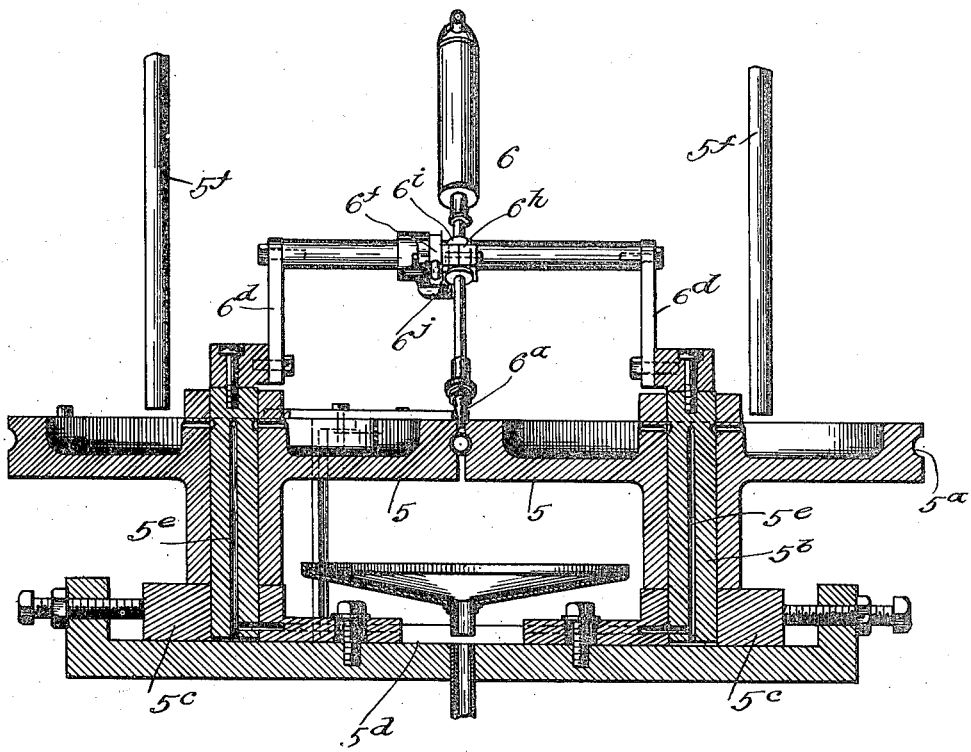

Figure 1 is a side elevation of said machine or apparatus; Fig. 2 is a plan view thereof; Fig. 3 is an enlarged plan view of that part of the machine in which the herein claimed welding step is performed. Figs. $3^a$, $3^b$, $3^c$, $3^d$, $3^e$, $3^f$ and $3^g$ are cross-sectional views, illustrating the evolution or development of the tube, from the flat strip metal stock to its finished cross-section; Fig. 4 is an enlarged vertical, longitudinal section, showing the dies and a portion of the welding tools which I employ in my process; Fig. 5 is a vertical section on the line $5^x$ of Fig. 4; Fig. 6 is an enlarged vertical, longitudinal section of the tools which I employ for welding the edges of the stock after giving it tubular form, also the tools that I use in removing the weld bur, and the die by which I reduce the tubing to given or specified cross section; and, Fig. 7 is a vertical cross section on the line $7^x$—$7^x$ of Fig. 6.

The continuous tube mill shown in the drawings is one which I devised for the purpose of carrying out the process described in aforesaid application Serial No. 638,202, including the steps herein claimed. A complete understanding of its mechanical details may be gained by reference to another of my applications, to-wit, Serial No. 638,203 of even date with Serial No. 638,202. In this present application I will describe and refer to its constituent parts only to the extent requisite to a full disclosure of all of the steps, acts and operations embraced in the process herein claimed. This process may be carried out with various other tools and implements and is not limited to the mill herein shown.

As set forth in application Serial No. 638,202 I make use of either hot-rolled or cold-rolled flat strip metal stock of a width approximating three times the diameter of the tubing to be produced. I provide this stock in the form of metal strips each of sufficient length to produce a large number of tubes. In carrying on the process I weld or otherwise connect the strips end to end in continuing series and thereby in effect maintain a continuous source of supply of the flat strip stock. It will be understood that the strips are of uniform cross section, i. e., of the same thickness and width. Having thus provided a source of supply of flat strip stock I dispose or position the end portion of the stock in a straight line. This end portion I confine or restrict at several points and, simultaneously at such points of confinement or restriction, I perform the several acts or steps by which the stock is maintained in motion at a constant rate of speed and during such motion is subjected to forces which continuously and progressively convert it into finished, straight tubes of definite or specified dimensions. To clearly indicate the points and spaces at and within which these several steps or acts are performed, I have applied to Fig. 1, a number of lines marked A, B, C, D, E, F, G, H, I and J, and will refer to the several divisions distinguished thereby. The process begins with the above described continuous source of supply of flat strip stock 1, at the point A and extends to the point J; that is, the process is continuously carried on and fully completed within the space between the lines or points A and J. I prefer to use strip stock 1, in bundle or reel form, and the constantly replenished reel R is shown at the left hand end of Fig. 1. The end portion of the stock which I position and maintain in a straight line, as aforesaid, and which is operated upon at various points, is co-extensive with the distance between the lines A and J; but as hereinafter described, during the greater part of the time, the straight portion of the stock is of less length, and at cut off moments its length corresponds to the distance between the lines A and H, a finished tube then having been severed from the stock. Having positioned the leading end portion of the stock in a straight line I limit it to movement in a longitudinally straight path by confining or laterally restricting it at approximately the points indicated by letters A', B, B', C, C', D, E, F, F', G and H. I impart constant speed longitudinal movement to the straight portion of the stock, and obviously to the whole of the stock, by grasping and pulling forward upon that portion of the stock which lies in the division F—G. By such action I exert tension upon the stock, rearwardly toward the source of supply. In other words, I constantly maintain under tension that portion of the stock which lies in the division F—A and simultaneously drive the stock forward at constant speed toward the point or process boundary J. Taking advantage of this tension upon the stock and of the forcible drawing movement thereof, I position various tools at the points last above mentioned and thereby work the stock into desired form and condition as it progresses from the point A to the point J. These several operations involve the initial progressive formation of the flat strip 1 into tubing with its edges in abutment along a straight line parallel with the axis of the tubing; then the welding of the seam edges; then the removal of the weld bur; then the reduction of the tubing to specified size; then the gradual projection and measuring of the reduced tubing; and then the severing of successively measured pieces or lengths; together with incidental and intermediate steps whereby the tension upon the stock is maintained at cross sectional constants in all stages and warping is prevented, which insures the delivery of the tubing in straight, non-distorted condition. Thus at a point adjacent the reel R, I position suitable forming tools or dies 2 and 3 and by proper use thereof I cause the flat stock while traversing the space B—C to gradually and in a cross sectionally equal manner form into a tube with its edges in longitudinal abutment along a straight line. I will hereafter refer to this step as the forming of the tubing.

Within the space B—G I perform the particular steps which characterize the process claimed in this application. At the point B' I manipulate or control the edges of the stock in such manner as to cause the seam to progressively form upon a line that is parallel with and directly above the axis of the tubing. This step is accomplished by means of the tool 4 and will be hereinafter referred to as the positioning of the seam of the tubing. As stated, I confine the stock at the point C'. Before it reaches that point it assumes tubular form. For the purposes of this present case the stock will be considered as an open seamed tube, at this point. To there hold the stock, I apply thereto tools which prevent its lateral movement in any direction. The tools which I usually employ and here show, are grooved metallic parts or tools 5, between which I pass the tubing. These tools are so constructed and positioned that they leave the seam edges of the tubing exposed between them. The steps performed by means of these tools 5 will be hereinafter referred to as the positioning and holding of the tubing against lateral movement and exposing the seam edges thereof. As will be presently explained, the positioning of the seam and this exposing of the seam edges have to do with the welding thereof. At the same time, and using the same tools 5 for the purpose, I not only practically encompass the tubing at the point C', but also hold and press the abutting seam edges firmly together at that point. This step will be hereinafter referred to as holding and pressing together the seam edges during the application of heat. And further, preferably with the same tools 5, I continuously chill the tubing to maintain a low temperature circumferentially throughout the same, at a point C', omitting the chilling effect only in the seam edges which are exposed between the tools or rolls 5. This step will be hereinafter referred to as the chilling of the tubing at the welding point, and the function of this step is to retain substantially the full strength of the tubing at the welding point and thus prevent the stretching or distorting of the tubing by the heavy tension to which it is subjected. Having thus prepared the tubing for welding I apply a gas flame at the point C' to the seam edges which are exposed at that point and I so localize or confine the heat that but a small portion, longitudinally considered, is raised to the welding point. This step of my process will be hereinafter referred to as uniting or welding the seam edges of the tubing. Obviously as the stock is in constant forward motion, I am able to weld the seam progressively as fast as fresh seam edges are presented to the welding flame. The uniting of the edges by heat may be accomplished by brazing the said edges but I do not stop with a weld of that character; instead I actually unite the edges autogenously by the simultaneous movement, holding or positioning, lateral pressure and heat application here described. The added tool or appliance that I prefer to use, comprises an oxy-acetylene gas torch 6. I hold the nozzle 6ª of this torch directly above the seam edges which are exposed between the rolls 5 and play the intense flame directly upon said edges at that point. The flame is directed downwardly and rearwardly toward the approaching metal. I carefully position the seam edges in a straight line as before explained and also secure the torch in fixed relation to the seam edges, to assure uniformity of effect from the flame. As the tubing passes forward under tension, the hot flame reduces the abutted edges of the tubing to a fused state whereupon, as they are held against warping or distending, they necessarily flow or weld together. In closely observing the action of the seam edges under the flame it will be found that as the edges approach the short, narrow and intensely hot welding flame, they are partially heated by the corona of the flame, but are nevertheless held closely together. When rendered desirable by the character of the tube or its speed of movement, I additionally preheat the tube by means of a second or advance torch Gª as indicated in Fig. 6. I carefully proportion the temperature of the welding flame to the quantity and speed of the metal to be welded. Under the intense heat of the welding flame proper the edges open enough to admit the flame to the actual edges and the welding is practically instantaneous at this point. On moving forward, away from the flame, the edge portions quickly contract to normal condition and quickly cool. Thus the fused metal is caused to set and the weld is completed before the united seam portions leave the immediate restraint or influence of the holding or pressure effecting tools. As an incidental step I prefer to cool the freshly united seam edge portions directly after they pass the welding zone, using water which is supplied by a nozzle or pipe 7.

The welding of the seam edges usually results in raising a slight bur upon the tubing and the water cooling of the tubing permits the immediate use of a tool to scrape or cut away this bur. In fact I remove the bur as fast as the welding is done by using for the purpose a knife or other tool 8, at the point D, which is but a short distance from the welding torch. This step will be hereinafter referred to as removing the weld bur. Preferably, I circumferentially compress and draw down the welded tubing to an exact given or specified diameter and cross-section. This is done at the point E and a tool which I find useful comprises a die 9 of less diameter than the initial tubing. The tubing is drawn through this die 9 and obviously I thereby accomplish the reduction and sizing of the tubing as rapidly as it is welded and without intermediate handling of the tubing, also without pause in or interruption of the production of tubing. Throughout the several steps herein set forth I am careful to so position the several tools and to use and operate them in such manner as to maintain a cross sectionally uniform tension in every part of the stock which lies within the division indicated by the vertical lines A and F. This step is important for I thereby avoid unequal stretching, warping or distortion of the stock. Any slight warping that may result from the welding operation is positively corrected by the act of forcibly reducing or drawing down the tubing as hereinafter described.

As explained I effect the tension upon and movement of the stock by force applied longitudinally within the intermediate division F—G. Though the stock moves constantly forward, I effect the necessary drawing force entirely within the pulling zone F—G; in brief, that zone is fixed and does not move. In a primary sense the then tubular stock is grasped circumferentially and a constant degree and constant speed pull or drawing is effected by a hand over hand action. While this could be done by hand with certain kinds of stock, the steel stock generally requires the use of a strong powerfully actuated tool or mechanism; which will not crush, mar or distort the tubing and yet will be adequate to the overcoming of the obstacles and resistances offered by the metal stock itself and by the other operations thereon. For the purpose of clasping the tubing circumferentially and effecting circumferentially uniform pull or tension thereon, I employ an appliance 10 which is in nature of an endless belt-like vise positioned in the space F—G. This belt carries pairs of clamping jaws set end to end thereon. The jaws are shaped to fit the tubing and each pair when closed together thereon practically incloses the portion of the tubing embraced. As will presently appear the straight upper stretch of the belt parallels the tube or tubing. The jaws are limited to movement transversely toward and from the tubing and are carried forward in continuous series by the rotation of the belt. The jaws which at any given instant constitute the upper or working stretch of the device are in exact alinement with the tubing. They are positively closed against the tubing and the strength of their frictional engagement therewith is such that in moving forward the jaws are prevented from slipping upon the tubing and the latter is pulled or drawn through the preceding tools or dies. I rotate the belt at constant speed and cause the several pairs of jaws to successively close upon the tubing to impart movement to the tubing and to open approximately at the end of the straight stretch of the belt. By clasping the tubing in this manner, that is, substantially the whole circumference of the tubing, the pull or tension is equalized throughout the circumference of the tubing and in consequence I am able to conduct this step of my process without distorting or warping the straight tubing which enters this pulling device. In drawing the stock forward in the manner explained, I also expel or project the tubing from and beyond the drawing device. If continuous stock is used, I then support the forwardly moving stock at convenient points as at H and I to maintain it in straight condition and define its path of movement. Near the delivery end of the drawing device I place a cutting off tool 11. This marks the inner end point from which I measure the tubes as they are produced and I operate the cut off device at the instant that the given or specified length of tubing has been projected beyond this point. I employ a measuring tool or appliance of which one part is a gage 12, which may be shifted toward and from said inner end measuring point, as required to determine the exact lengths of successive tubes. At the instant that the forwardly moving stock strikes the gage I set the cut off tool in operation. In practice I so relate the gaging and cutting off tools that for an instant they move forward with the tubing without changing the distance between the tools. And during this movement I sever the tubing at said inner end measuring point. At that time, I also remove the gage and if the next tube is to be of different length, I readjust the gage for co-action with the newly presented end of the stock. Obviously the tube which is severed will fall down out of the way and will not interfere with the return of the cut off tool to the inner end measuring point; nor does the severed or completed tube interfere with or stop the continued forward movement of the stock. Those who are familiar with the ordinary processes of manufacturing tubing will at once perceive that many steps and operations which are inherent to the older processes are entirely eliminated and avoided in and by my herein described continuous process.

To the end that every detail of the herein claimed process, as practised with the herein shown tools, may be more certainly understood, I will now more fully describe the construction and operation of certain tools and mechanisms detailed in the drawings.

In the drawings, Z represents a table or bench on which I prefer to fix the several tools. The construction of the forming mechanism is disclosed in Fig. 4. On leaving the forming rolls 2 the strip enters a stationary forming die 3, comprising an annular die $3^a$ and tapered mandrel $3^b$, in a standard $3^c$, the mandrel being adjustable on the block $3^d$. The sleeve $3^e$ containing the die $3^a$ has a flaring or tapered receiving throat $3^f$, which may assist in shaping the strip of metal as it passes through the same. By adjustment of the parts $3^a$ and $3^b$, I cause the edges of the stock to tightly close together. The several stages of the development of the tubing are depicted in Figs. $3^a$, $3^b$, $3^c$ and $3^d$. Fig. $3^a$ shows the cross section of the strip as it leaves the reel; Fig. $3^b$ shows the cross section of the strip when in the rolls 2, 2; Fig. $3^c$ shows its form at the moment that it is about to enter the die 3; and Fig. $3^d$ shows the form of the tube as it emerges from the die 3. The edges of the metal strip are indicated by the character $t$, throughout the drawings; and as shown in Fig. $3^d$ these edges are in substantial abutment when the tube leaves the forming die 3, and form the seam which is to be closed.

To prevent the formation of a wavy seam and prepare the tubing for reception by the welding mechanism, I employ a tube-seam-positioning device 4, which limits the seam to a vertical plane which includes the axis of the tubing. The tube seam positioning device 4 may be a part of the forming mechanism and is one of the tools which I use in welding the tubing. As shown in Figs. 4 and 5 the positioner may be at the throat of the die 3. It is a hardened steel cross bar $4^a$ fixed to a collar $4^b$ which is rotatable on the sleeve $3^e$. A worm gearing $4^c$ is provided for rotating the collar and cross bar 4ᵃ. The ends of the bar 4ᵃ bear on the edges of the stock, (see Fig. 3ᶜ) and by turning or tilting the bar one or the other edge of the partially formed stock may be depressed, and in this manner the tendency of the strip to creep or twist laterally or circumferentially in the dies may be corrected, thereby insuring a straight seam, which by means of this device and the rolls 5, I am able to position in the exact manner required for the welding of the seam edges. Where preformed tubing is to be welded the die 3 becomes a guide.

The welding tools are best shown in Figs. 4, 6 and 7. One element of the welding mechanism is the oxy-acetylene gas torch 6 of which 6ᵃ is the burner tip or nozzle, and 5, 5, are the holding, pressing and chilling rolls. The tension on the tube tends to close the seam but these rolls insure the desired position and condition of the tubing with respect to the torch. The rolls rotate freely in contact with the tubing. Each roll contains a peripheral groove 5ᵃ conformed to the shape of the side of the tubing. Referring to Fig. 7 it will be seen that the rolls occupy a horizontal plane and that the tube passes between them and is nearly encompassed thereby. They rotate on vertical shafts 5ᵇ carried by adjustable blocks 5ᶜ placed in the transverse guideway 5ᵈ. By manipulating the adjusting screws shown in Figs. 6 and 7, the two rolls 5 may be separated or moved together as required to correctly proportion their pressure upon the tubing. The tops of the rolls rise above the tubing and in effect, form a deep groove having the tube seam edges at its bottom. The nozzle of the welding torch enters this groove in position to direct the flame upon the seam edges at a point between the two rolls; in other words, at the point where the tube is most securely held. The rolls are of such size that they rapidly absorb and radiate the heat communicated to them and serve to chill or cool all parts of the tube not exposed between the rolls. They may be additionally cooled with water supplied from pipes 5ᶠ and overflowing through the ducts 5ᵉ. The torch is of an approved type, comprising the nozzle or tip 6ᵃ and gas conducting pipes 6ᵇ equipped with valved nipples for the flexible gas pipes 6ᶜ that supply oxygen and acetylene from suitable sources, not shown. The welding torch is supported in such manner that it may be quickly adjusted to working position or moved away. 6ᵈ are brackets carrying a normally fixed arm 6ᵉ, pivoted to which is a torch carrying lever 6ᶠ. Stop shoulders 6ᵍ limit the downward movement of the lever. A split carrying block 6ʰ contains a swivel mounting 6ⁱ for the torch proper. The part 6ʰ is connected to the lever 6ᶠ by a horizontal stud. This arrangement permits vertical adjustment of the torch; also rotary adjustment of the nozzle. Accurate adjustment of the nozzle is obtained by a spring resisted thumb screw 6ʲ connecting the torch carrying block to the sustaining lever 6ᶠ. Metal which is vaporized by the welding flame sometimes condenses upon the tip of the nozzle and tends to distort the welding flame, and to maintain a uniform flame I employ a clearing device, the same comprising a metal finger 6ᵏ on a spring returned lever 6ˡ pivoted at 6ᵐ, see Figs. 2, 3 and 6. One of the two rolls 5 has pins 6ⁿ which strike and operate the lever 6ˡ, thereby reciprocating the finger 6ᵏ across the end of the nozzle, to periodically clean it.

The bur removing tool 8 appears in Figs. 1, 2, 3 and 6, and is preferably a planer knife, tool or blade which is rigidly held by a block or standard that contains the reducing die 9. The tool is vertically adjustable on the end 8ᵃ of the arm 8ᵇ which overhangs the standard 9. As the tubing travels beneath the sharp edge of the planer tool the latter turns, cuts or scrapes off the bur, leaving the top of the tubing as smooth as other surfaces thereof, and making the seam practically invisible.

One of the several ways of starting the use of the tools shown is as follows: I place the end of the strip stock in the guide 2ˣ and enter it between the rolls 2, 2. I then turn the rolls and thereby advance the strip and begin the forming operation. I then pass a "threading" tube rearwardly through the pulling mechanism 10, the die 9, the rolls 5, 5 and the die 3ᵃ, first removing the mandrel 3ᵇ. Then I conform the end of the stock to the end of the tube and weld them together. This welding may be done with a hand torch, using oxygen and acetylene. To insure the gripping action of the jaws of the pulling mechanism upon the tube, I insert a temporary filler between the jaws and the tube, the filler being of sufficient length to act with the tube until the stock sufficiently enters the pulling mechanism. This filler should be a strip of soft metal of such thickness as to compensate for the difference in the sizes of the tube and the die 3ᵃ. It may be inserted most conveniently by temporarily opening the jaws of the pulling mechanism. After it is put in place the jaws should be restored to proper working position. Having prepared the parts in this way, I then start the pulling mechanism into rotation and thereby pull the tube and the attached stock through the several tools. When the end of the stock emerges from the pulling mechanism 10 the "threading" tube should be cut off.

I claim:

1. The herein described process of manufacturing welded metal tubing that consists in longitudinally moving tubing having a longitudinal seam by pulling upon a progressive end portion of the tubing both positively positioning the seam edges of the tubing and chilling the remainder thereof at a point in advance of the place of the application of the pulling force and applying a welding flame to the seam edges at that point and thereby welding the seam edges together as the tubing is drawn forward.

2. The improvement in the art of manufacturing welded metal tubing that consists in continuously (at a substantially constant rate of speed) drawing an open seamed metal tube through a guide or die and thereby progressively maintaining the forward portion of the tubing in tension, positively positioning the seam of the tubing at one point in the tensioned portion thereof, holding the seam edges together at that point and applying a welding flame to said edges at that point, thereby progressively welding said edges and finally progressively relieving the tension upon the moving tube after said edges are thus welded.

3. The improvement in the art of manufacturing welded metal tubing that consists in longitudinally moving metal tubing having a longitudinal seam at a constant rate of speed, and progressively, at one point, positively positioning the seam and holding the tubing against lateral movement in any direction, pressing the seam edges together at that point, applying a welding flame to said edges at that point, and progressively maintaining the remainder of the tubing at a low temperature.

4. The improvement in the art of manufacturing welded metal tubing that consists in longitudinally moving metal tubing having a longitudinal seam at a constant rate of speed, and progressively, at one point, positively positioning the seam and holding the tubing against lateral movement in any direction, pressing the seam edges together at that point and applying a welding flame to said edges at that point to weld the same, substantially as described.

5. The improvement in the art of manufacturing welded metal tubing that consists in longitudinally moving metal tubing having a longitudinal seam at a constant rate of speed, and progressively, at one point, positively positioning the seam and holding the tubing against lateral movement in any direction, pressing the seam edges together at that point, applying a welding gas flame to said edges at that point and confining the welding heat to said edges by chilling the remainder of the tubing at said point.

6. The improvement in the art of manufacturing welded metal tubing which consists in maintaining a longitudinally seamed tube in tension and simultaneously moving the same longitudinally, while at one point progressively positioning the seam and holding the tube against lateral movement in any direction and applying welding heat to said edges at that point, thereby welding said edges and thereafter relieving the tension upon the welded portion of the tubing.

7. The improvement in the art of manufacturing welded metal tubing that consists in maintaining a longitudinally seamed tube in tension and simultaneously moving the same longitudinally, at one point positively positioning the seam of the moving tube and there holding the tube against lateral movement in any direction, positively pressing the seam edges together at that point, applying a welding flame to said edges at that point, and maintaining the remainder of the tubing at a low temperature, and progressively relieving the tension upon the tubing as the weld cools.

8. The improvement in the art of manufacturing welded metal tubing that consists in moving a seamed metal tube longitudinally forward at a constant speed, subjecting the tubing to torsional strain to position the seam of the tubing in a straight line and applying a welding gas flame only to the edges of said seam at one point in the travel of the tubing and thereby welding the seam as rapidly as the tubing is moved, meantime progressively chilling the remainder of the tubing at the welding point.

9. The improvement in the art of manufacture butt welded metal tubing, that consists in setting and maintaining an open seamed tube in longitudinal motion and tension, by applying resistance to movement at one place in the line of travel of the tube and by applying circumferentially uniform pulling forces to the forward portion of the tube, and positively positioning the seam of the tube in a straight line as it moves forward and at a point between said resistance and the place of pulling force holding the tube against lateral movement in any direction, and meantime applying a welding gas flame and lateral pressure to the seam edges of the tube of said point, substantially as described.

In testimony whereof, I have hereunto set my hand this 6th day of March, 1912, in the presence of two subscribing witnesses.

MARSHALL BURNS LLOYD.

Witnesses:
C. O. PORTERFIELD,
HILDA C. PETERSON.